US012684344B2

(12) United States Patent
Ping et al.

(10) Patent No.: US 12,684,344 B2
(45) Date of Patent: *Jul. 14, 2026

(54) USER PLANE TRAFFIC HANDLING FOR EMERGENCY CASE

(71) Applicant: Nokia Technologies Oy, Espoo (FI)

(72) Inventors: Jing Ping, Chengdu (CN);
Ranganathan Mavureddi Dhanasekaran, Munich (DE)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/948,861

(22) Filed: Nov. 15, 2024

(65) Prior Publication Data

US 2026/0143337 A1      May 21, 2026

Related U.S. Application Data

(63) Continuation of application No. 18/689,738, filed as application No. PCT/CN2023/070530 on Jan. 4, 2023.

(51) Int. Cl.
*H04W 12/033* (2021.01)
*H04W 12/106* (2021.01)
(52) U.S. Cl.
CPC ....... *H04W 12/033* (2021.01); *H04W 12/106* (2021.01)
(58) Field of Classification Search
None
See application file for complete search history.

(56) References Cited

U.S. PATENT DOCUMENTS

2021/0160289 A1 * 5/2021 Wifvesson .......... H04W 12/033
2023/0239686 A1 * 7/2023 Li ........................ H04W 12/37
726/1

FOREIGN PATENT DOCUMENTS

CA       3190953 A1     2/2022
CN     103686704 A     3/2014
(Continued)

OTHER PUBLICATIONS

3gpp(https://www.etsi.org/deliver/etsi_ts/133500_133599/133501/17.07.00_60/ts_133501v170700p.pdf, retrieved Feb. 27, 2025) (Year: 2022).*

(Continued)

*Primary Examiner* — Brian F Shaw

(74) *Attorney, Agent, or Firm* — BURR & FORMAN LLP

(57)        ABSTRACT

Example embodiments of the present disclosure relate to UP traffic handling for emergency case. A first terminal device determines that UP traffic is to be communicated between the first terminal device and a second terminal device without confidentiality protection. The first terminal device determines that the UP traffic is to be communicated between the first terminal device and the second terminal device without integrity protection or with a partial integrity protection. The first terminal device transmits, to the second terminal device, a message indicating that the UP traffic is to be communicated without the confidentiality protection or the integrity protection, or without the confidentiality protection and with the partial integrity protection. In turn, the first terminal device communicates the UP traffic between the first terminal device and the second terminal device without the confidentiality protection or the integrity protection, or without the confidentiality protection and with the partial integrity protection.

16 Claims, 10 Drawing Sheets

(56)  References Cited

FOREIGN PATENT DOCUMENTS

| | | |
|---|---|---|
| CN | 113676898 A | 11/2021 |
| CN | 113748695 A | 12/2021 |
| CN | 114079915 A | 2/2022 |
| CN | 114600507 A | 6/2022 |
| CN | 115278658 A | 11/2022 |
| CN | 115362692 A | 11/2022 |
| WO | 2018/138379 A1 | 8/2018 |
| WO | 2020/173859 A1 | 9/2020 |
| WO | 2021/177732 A1 | 9/2021 |

OTHER PUBLICATIONS

3GPP-ProSe(2024)Security Aspects of Proximity based Services in the 5G System (5GS) (3GPP TS 33.503 version 17.6.0 Release 17), retrieved Jan. 14, 2024 from: https://www.etsi.org/deliver/etsi_ts/133500_133599/133503/17.06.00_60/ts_133503v170600p.pdf (Year: 2024).*

"3rd Generation Partnership Project; Technical Specification Group Services and System Aspects; Security Aspects of Proximity based Services (ProSe) in the 5G System (5GS) (Release 17)", 3GPP TS 33.503, V17.1.0, Sep. 2022, pp. 1-49.

"3rd Generation Partnership Project; Technical Specification Group Services and System Aspects; Study on security aspects of Proximity Based Services (ProSe) in 5G System (5GS) phase 2 (Release 18)", 3GPP TR 33.740, V0.4.1, Nov. 2022, pp. 1-91.

"3rd Generation Partnership Project; Technical Specification Group Services and System Aspects; Security architecture and procedures for 5G system (Release 17)", 3GPP TS 33.501, V17.7.0, Sep. 2022, pp. 1-292.

"3rd Generation Partnership Project; Technical Specification Group Services and System Aspects; Study on system enhancement for Proximity based Services (ProSe) in the 5G System (5GS); Phase 2 (Release 18)", 3GPP TR 23.700-33, V18.0.0, Dec. 2022, pp. 1-184.

"IEEE 802.11", Wikipedia, Retrieved on Dec. 1, 2024, Webpage available at : https://en.wikipedia.org/wiki/IEEE_802.11.

International Search Report and Written Opinion received for corresponding Patent Cooperation Treaty Application No. PCT/CN2023/070530, dated Sep. 7, 2023, 8 pages.

"Clarification on the security policy in TS 33.536", 3GPP TSG SA WG3 (Security) Meeting #98e-bis, S3-200655, Agenda: 2.10, LG Electronics, Apr. 14-17, 2020, 3 pages.

U.S. Office Action dated Mar. 13, 2025 corresponding to related U.S. Appl. No. 18/689,738.

Korean Notice of Preliminary Rejection, with partial English language translation, corresponding to KR Application No. 10-2024-7011190, dated May 1, 2025.

Chinese Office Action, with machine English translation, corresponding to CN Application No. 202380014571.8 dated Mar. 14, 2025.

LG Electronics et al., "Clarification on the security policy in TS 33.536", 3GPP TSG SA WG3 (Security) Meeting #98e-bis, Apr. 14-17, 2020, e-meeting, S3-200655, 4 pages.

Chinese Office Action, with machine English translation, corresponding to CN Application No. 202380014571.8, dated Jun. 14, 2025.

Japanese Office Action with English language summary, corresponding to JP Application No. 2024-519576, dated Aug. 26, 2025.

Chinese Office Action with English language translation, corresponding to CN Application No. 202380014571.8, dated Sep. 18, 2025.

* cited by examiner

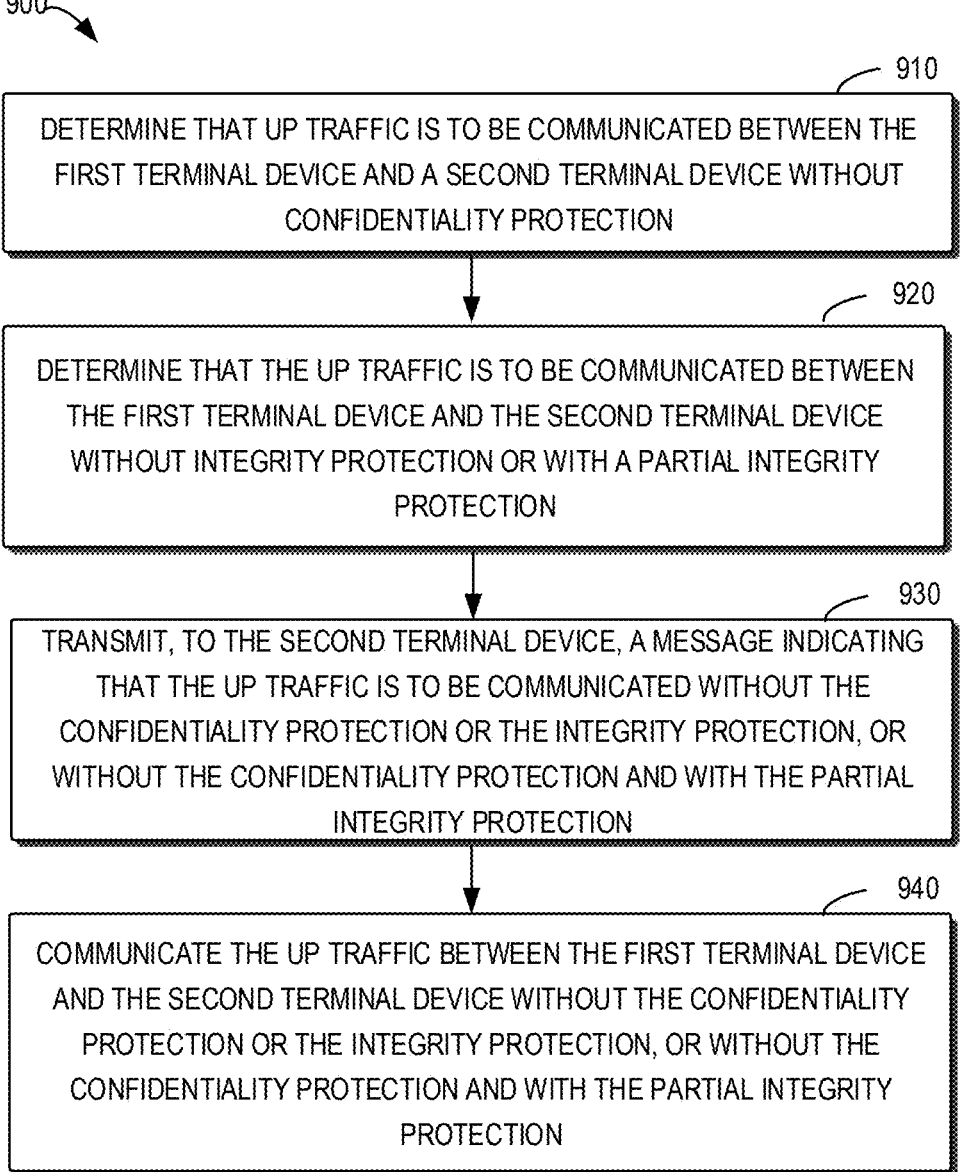

900

910

DETERMINE THAT UP TRAFFIC IS TO BE COMMUNICATED BETWEEN THE FIRST TERMINAL DEVICE AND A SECOND TERMINAL DEVICE WITHOUT CONFIDENTIALITY PROTECTION

920

DETERMINE THAT THE UP TRAFFIC IS TO BE COMMUNICATED BETWEEN THE FIRST TERMINAL DEVICE AND THE SECOND TERMINAL DEVICE WITHOUT INTEGRITY PROTECTION OR WITH A PARTIAL INTEGRITY PROTECTION

930

TRANSMIT, TO THE SECOND TERMINAL DEVICE, A MESSAGE INDICATING THAT THE UP TRAFFIC IS TO BE COMMUNICATED WITHOUT THE CONFIDENTIALITY PROTECTION OR THE INTEGRITY PROTECTION, OR WITHOUT THE CONFIDENTIALITY PROTECTION AND WITH THE PARTIAL INTEGRITY PROTECTION

940

COMMUNICATE THE UP TRAFFIC BETWEEN THE FIRST TERMINAL DEVICE AND THE SECOND TERMINAL DEVICE WITHOUT THE CONFIDENTIALITY PROTECTION OR THE INTEGRITY PROTECTION, OR WITHOUT THE CONFIDENTIALITY PROTECTION AND WITH THE PARTIAL INTEGRITY PROTECTION

Fig. 9

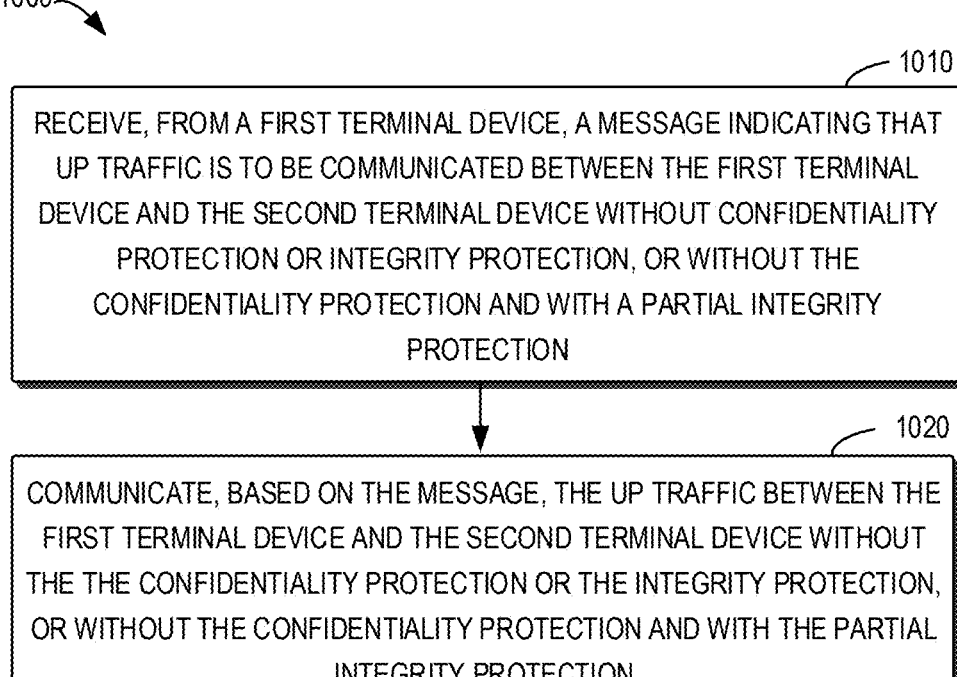

1000

1010

RECEIVE, FROM A FIRST TERMINAL DEVICE, A MESSAGE INDICATING THAT UP TRAFFIC IS TO BE COMMUNICATED BETWEEN THE FIRST TERMINAL DEVICE AND THE SECOND TERMINAL DEVICE WITHOUT CONFIDENTIALITY PROTECTION OR INTEGRITY PROTECTION, OR WITHOUT THE CONFIDENTIALITY PROTECTION AND WITH A PARTIAL INTEGRITY PROTECTION

1020

COMMUNICATE, BASED ON THE MESSAGE, THE UP TRAFFIC BETWEEN THE FIRST TERMINAL DEVICE AND THE SECOND TERMINAL DEVICE WITHOUT THE THE CONFIDENTIALITY PROTECTION OR THE INTEGRITY PROTECTION, OR WITHOUT THE CONFIDENTIALITY PROTECTION AND WITH THE PARTIAL INTEGRITY PROTECTION

Fig. 10

USER PLANE TRAFFIC HANDLING FOR EMERGENCY CASE

FIELD

Various example embodiments of the present disclosure generally relate to the field of telecommunication and in particular, to devices, methods, apparatuses and computer readable storage media for handling user plane (UP) traffic for emergency case of 5G ProSe UE-to-network relaying service.

BACKGROUND

The Fifth Generation (5G) system support proximity based services (ProSe) feature. 5G ProSe features may comprise 5G ProSe Direct Discovery, 5G ProSe Direct Communication and 5G ProSe UE-to-Network (U2N) Relay. In the 5G ProSe UE-to-Network Relay feature, a remote user equipment (UE) may connect to a UE-to-Network relay via a PC5 interface with 5G ProSe Direct Communication, and communicate with a data network via the UE-to-Network relay and 5G network. The 5G ProSe UE-to-Network Relay feature supports emergency service over UE-to-Network relay. The protection of user plane (UP) traffic between the remote UE and the UE-to-Network relay in emergency case needs to be studied.

SUMMARY

In general, example embodiments of the present disclosure provide a solution for handling UP traffic for emergency case.

In a first aspect, there is provided a first terminal device. The first terminal device comprises at least one processor and at least one memory storing instructions. When the instructions are executed by the at least one processor, the instructions cause the first terminal device at least to: determine that UP traffic is to be communicated between the first terminal device and a second terminal device without confidentiality protection; determine that the UP traffic is to be communicated between the first terminal device and the second terminal device without integrity protection or with a partial integrity protection; transmit, to the second terminal device, a message indicating that the UP traffic is to be communicated without the confidentiality protection or the integrity protection, or without the confidentiality protection and with the partial integrity protection; and communicate the UP traffic between the first terminal device and the second terminal device without the confidentiality protection or the integrity protection, or without the confidentiality protection and with the partial integrity protection.

In a second aspect, there is provided a second terminal device. The second terminal device comprises at least one processor and at least one memory storing instructions. When the instructions are executed by the at least one processor, the instructions cause the second terminal device at least to: receive, from a first terminal device, a message indicating that UP traffic is to be communicated between the first terminal device and the second terminal device without confidentiality protection or integrity protection, or without the confidentiality protection and with a partial integrity protection; and communicate, based on the message, the UP traffic between the first terminal device and the second terminal device without the confidentiality protection or the integrity protection, or without the confidentiality protection and with the partial integrity protection.

In a third aspect, there is provided a method. The method comprises: determining, at a first terminal device, that UP traffic is to be communicated between the first terminal device and a second terminal device without confidentiality protection; determining that the UP traffic is to be communicated between the first terminal device and the second terminal device without integrity protection or with a partial integrity protection; transmitting, to the second terminal device, a message indicating that the UP traffic is to be communicated without the confidentiality protection or the integrity protection, or without the confidentiality protection and with the partial integrity protection; and communicating the UP traffic between the first terminal device and the second terminal device without the confidentiality protection or the integrity protection, or without the confidentiality protection and with the partial integrity protection.

In a fourth aspect, there is provided a method. The method comprises: receiving, at a second terminal device from a first terminal device, a message indicating that UP traffic is to be communicated between the first terminal device and the second terminal device without confidentiality protection or integrity protection, or without the confidentiality protection and with a partial integrity protection; and communicating, based on the message, the UP traffic between the first terminal device and the second terminal device without the confidentiality protection or the integrity protection, or without the confidentiality protection and with the partial integrity protection.

In a fifth aspect, there is provided an apparatus. The apparatus comprises: means for determining, at a first terminal device, that user plane (UP) traffic is to be communicated between the first terminal device and a second terminal device without confidentiality protection; means for determining that the UP traffic is to be communicated between the first terminal device and the second terminal device without integrity protection or with a partial integrity protection; means for transmitting, to the second terminal device, a message indicating that the UP traffic is to be communicated without the confidentiality protection or the integrity protection, or without the confidentiality protection and with the partial integrity protection; and means for communicating the UP traffic between the first terminal device and the second terminal device without the confidentiality protection or the integrity protection, or without the confidentiality protection and with the partial integrity protection.

In a sixth aspect, there is provided an apparatus. The apparatus comprises: means for receiving, at a second terminal device from a first terminal device, a message indicating that user plane (UP) traffic is to be communicated between the first terminal device and the second terminal device without confidentiality protection or integrity protection, or without the confidentiality protection and with a partial integrity protection; and means for communicating, based on the message, the UP traffic between the first terminal device and the second terminal device without the confidentiality protection or the integrity protection, or without the confidentiality protection and with the partial integrity protection.

In a seventh aspect, there is provided a computer readable medium. The computer readable medium comprises program instructions that, when executed by at least one processor, cause an apparatus to perform at least the method according to the third or fourth aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 9 illustrates a flowchart of a method implemented at a first terminal device in accordance with some example embodiments of the present disclosure;

FIG. 10 illustrates a flowchart of a method implemented at a second terminal device in accordance with some example embodiments of the present disclosure;

Throughout the drawings, the same or similar reference numerals represent the same or similar element.

DETAILED DESCRIPTION

Figure 1:
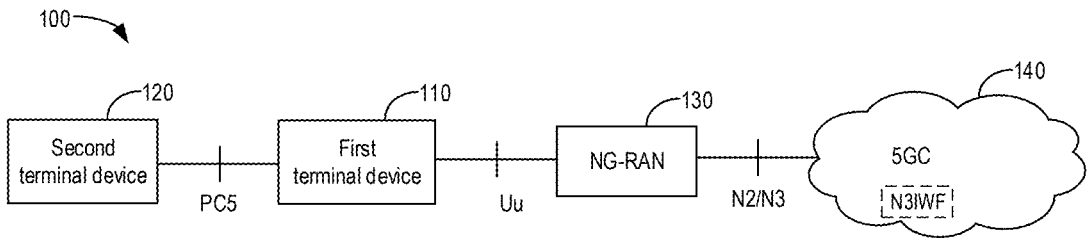
FIG. 1 illustrates an example communication network in which example embodiments of the present disclosure may be implemented.

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other example embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular example embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) new radio (NR) communication protocols, and/or any other protocols either currently known or to be developed in the future. Example embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. An RAN split architecture comprises a gNB-CU (Centralized unit, hosting RRC, SDAP and PDCP) controlling a plurality of gNB-DUs (Distributed unit, hosting RLC, MAC and PHY).

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication environment 100 in which example embodiments of the present disclosure can be implemented. The environment 100 may comprise a first terminal device 110, a second terminal device 120, a next generation radio access network (NG-RAN) 130 and an 5G core network (5GC) 140.

It is to be understood that the number of devices is only for ease of understanding without suggesting any limitations. The communication environment 100 may include any suitable number or type of the devices adapted for implementing embodiments of the present disclosure.

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G) or the future sixth generation (6G) wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

In some example embodiments, the communication environment 100 may support proximity based services (ProSe) feature, such as 5G ProSe, 4G ProSe and so on. Hereinafter, example embodiments of the present disclosure will be described by taking 5G ProSe as example. However, the present disclosure may be applied to 4G ProSe or any future ProSe.

5G ProSe feature may comprise 5G ProSe Direct Discovery, 5G ProSe Direct Communication and 5G ProSe UE-to-Network (U2N) Relay.

In the 5G ProSe UE-to-Network Relay feature, the second terminal device 120 may connect to the first terminal device 110 via a PC5 interface with 5G ProSe Direct Communication, and communicate with the 5GC 140 via the first terminal device 110 and the NG-RAN 130. In this regard, the second terminal device 120 may be referred to as a remote terminal device 120 or a remote user equipment (UE) 120, and the first terminal device 110 may be referred to as a UE-to-Network (U2N) relay or a relay UE 120.

The 5G ProSe UE-to-Network Relay feature may support emergency service over UE-to-Network relaying. In 3GPP Technical Report (TR) 23.700-33, key issue #7 is about support of Emergency for UE-to-Network Relaying. According to 3GPP Technical Specification (TS) 22.101, emergency service is defined as citizen to authority services, and it is left to the national authorities to decide whether the network accepts emergency calls e.g. for valid UE only, or for UEs without a Subscriber Identity Module (SIM), Universal Subscriber Identity Module (USIM) or International Subscriber Identity Module (ISIM).

In the 5G ProSe UE-to-Network relaying, if there is an emergency request from a remote UE, it implies that a relay UE needs to be responsible for remote UE's emergency service.

A remote UE which has no USIM inserted may need to initiate an emergency service with a network over PC5 interface via a Layer 3 UE-to-network relay. This remote UE can only discover UE-to-network relays which indicates a relay service code (RSC) for emergency in clear text. Also, this remote UE is not able to establish a secure PC5 link with a UE-to-network relay.

Based on the operator policy, the relay UE needs to support to establish PC5 communication for emergency service with or without PC5 security.

Emergency service cannot be fulfilled if a remote UE cannot be properly identified and establish the PC5 security with the relay UE (if required).

The 5G system shall support the establishment of PC5 communication for emergency service over UE-to-network relay with or without PC5 security.

TR 33.740 proposed a solution #27 for support emergency service over Layer 3 (L3) UE-to-Network Relay This solution addresses key issue #6: Support Emergency Service over UE-to-Network Relay. This solution addresses a L3 UE-to-Network relay.

According to the solution #27, in the 5G ProSe UE-to-Network relaying, if there is an emergency request from the remote UE, the relay UE is responsible for remote UE's emergency service. It is assumed the relay UE gets the regulation and the associated operator policy about emergency service from the relay UE's serving PLMN.

Based on the regulation and the operator policy, the relay UE supports to establish PC5 communication for emergency service, for either an authenticated remote UE (e.g. remote UE with USIM and properly being authenticated by user plane (UP) or control plane (CP) based security procedure) or an unauthenticated remote UE (for example, a remote UE without USIM or authentication cannot complete for any reason).

Based on the regulation and the operator policy, the announcement and discovery of Emergency RSC and the PC5 link establishment may be performed without security protection, for example, for a remote UE without USIM nor pre-configured discovery security materials.

In remote UE Report for emergency service, Remote User ID i.e. Control Plane ProSe Remote User Key/User Plane ProSe Remote User Key (CP-PRUK/UP-PRUK) ID is used as UE ID for the authenticated remote UE. In case of unauthenticated remote UE, Permanent Equipment Identifier (PEI) is used to identify the UE in remote UE Report.

It is assumed that the 5G ProSe enabled UE acting as Relay has a USIM and is registered to a PLMN in case of emergency service.

Figure 2:
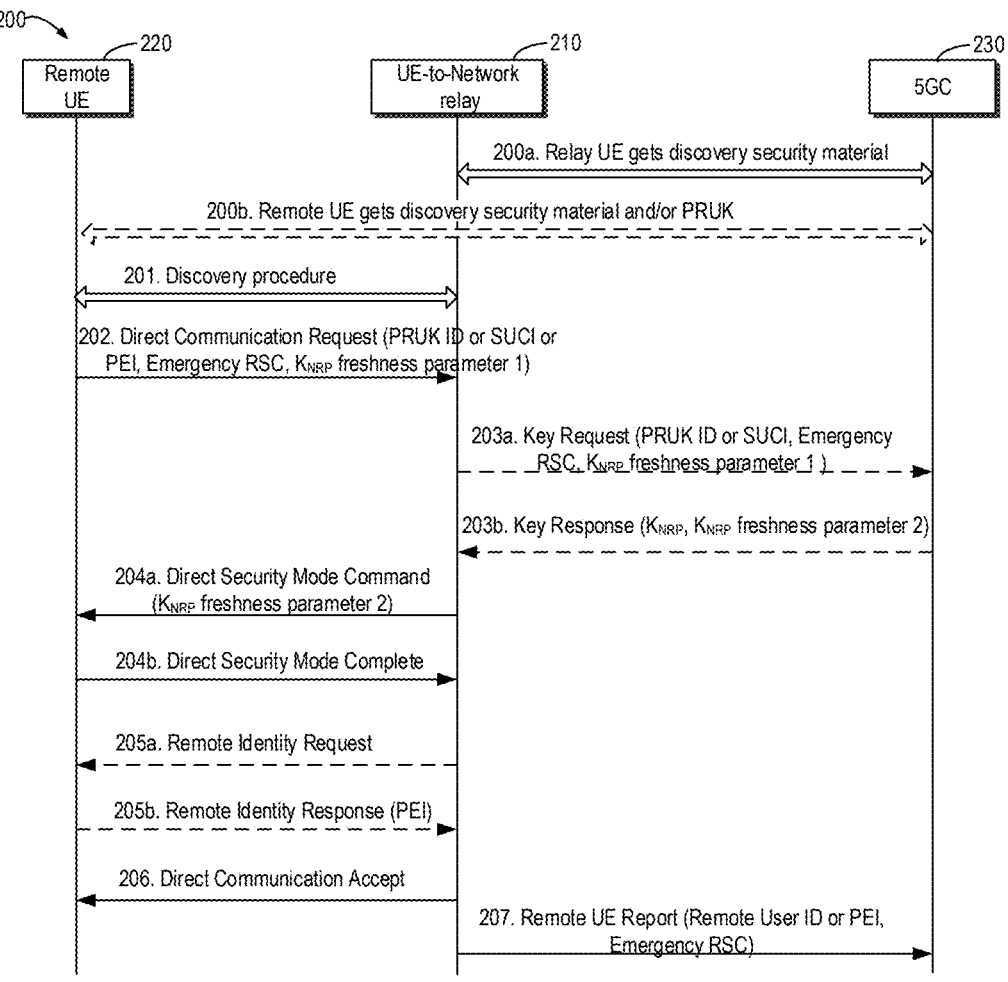
FIG. 2 illustrates a high-level procedure of emergency service over UE-to-Network relay.

FIG. 2 illustrates a high-level procedure of emergency service over UE-to-Network relay. It shall be understood that 5GC Network Functions (NFs) and internal signaling are not described in detail here for brevity.

As shown in FIG. 2, at 200a, an 5G ProSe UE-to-Network relay 210 is provisioned with the discovery security materials as described in TS 33.503. Based on the regulation and the operator policy, there may or may not be discovery security materials provisioned for Emergency RSC.

At 200b, an 5G ProSe remote UE 220 is provisioned with the discovery security materials and retrieves the UP-PRUK and UP-PRUK ID for UP based security method from the network as described in TS 33.503. Based on the regulation and the operator policy, there may be or may be no discovery security materials provisioned for Emergency RSC.

If the 5G ProSe remote UE 220 is USIM-less, the step 200b is skipped. The Emergency RSC and the discovery security materials if exist are locally configured in the 5G ProSe remote UE 220.

At 201, the discovery procedure for the Emergency RSC is performed between the 5G ProSe remote UE 220 and the 5G ProSe UE-to-Network Relay 210 using the discovery parameters and discovery security material as described in TS 33.503.

Based on the regulation and the operator policy, the announcement and discovery of Emergency RSC may be performed without security protection.

At 202, if the 5G ProSe remote UE 220 has USIM, the 5G ProSe remote UE 220 transmits a Direct Communication Request (DCR) that contains CP-PRUK/UP-PRUK ID or Subscription Concealed Identifier (SUCI), Emergency RSC and $K_{NRP}$ freshness parameter 1 to the 5G ProSe UE-to-Network Relay 210. The message may additionally include the PEI of the 5G ProSe remote UE 220.

If the 5G ProSe remote UE 220 is USIM-less, the 5G ProSe remote UE 220 transmits a Direct Communication Request that contains PEI, Emergency RSC to the 5G ProSe UE-to-Network Relay 210.

At 203a and 203b, if CP-PRUK/UP-PRUK ID or SUCI is received, the 5G ProSe UE-to-Network Relay 210 performs UP or CP based security procedure as described in TS33.503.

If only PEI and Emergency RSC are received, the 5G ProSe UE-to-Network Relay 210 skips the steps 203a and 203b if the regulation and the operator policy allow.

At 204a, if the steps 203a and 203b are successfully performed, the 5G ProSe UE-to-Network Relay 210 performs Direct Security Mode Command procedure towards the 5G ProSe remote UE 220 as described in TS33.503.

At 204b, the 5G ProSe remote UE 220 transmits a Direct Security Mode Complete message to the 5G ProSe UE-to-Network Relay 210.

If the steps 203a and 203b are failed or skipped, for example, the 5G ProSe remote UE 220 is USIM-less, the 5G ProSe UE-to-Network Relay 210 performs Direct Security Mode Command procedure with Null ciphering and integrity protection if the regulation and the operator policy allow.

At 205a, if the 5G ProSe remote UE 220 is not authenticated successfully via UP or CP based security procedure and PEI is not received from Direct Communication Request, the 5G ProSe UE-to-Network Relay 210 transmits Remote Identity Request to the 5G ProSe remote UE 220 to retrieve the PEI based on the regulation and the operator policy.

At 205b, the 5G ProSe remote UE 220 transmits Remote Identity Response comprising the PEI to the 5G ProSe UE-to-Network Relay 210.

At 206, the 5G ProSe UE-to-Network Relay 210 transmits a Direct Communication Accept message to the 5G ProSe remote UE 220 to finish the PC5 connection establishment procedures for the emergency service.

At 207, when the 5G ProSe Layer-3 UE-to-Network Relay 210 transmits a remote UE Report to an 5GC 230 for the Emergency RSC, the 5G ProSe Layer-3 UE-to-Network Relay 210 includes Remote User ID i.e. CP-PRUK/UP-PRUK ID if UP or CP based security procedure is successfully performed. Otherwise, the 5G ProSe Layer-3 UE-to-Network Relay 210 includes the PEI of the 5G ProSe remote UE 220 in the remote UE Report.

It shall be noted that the protection of the UP traffic between the 5G ProSe remote UE 220 and the 5G ProSe Layer-3 UE-to-Network Relay 210 in emergency case needs to be addressed.

Figure 3:
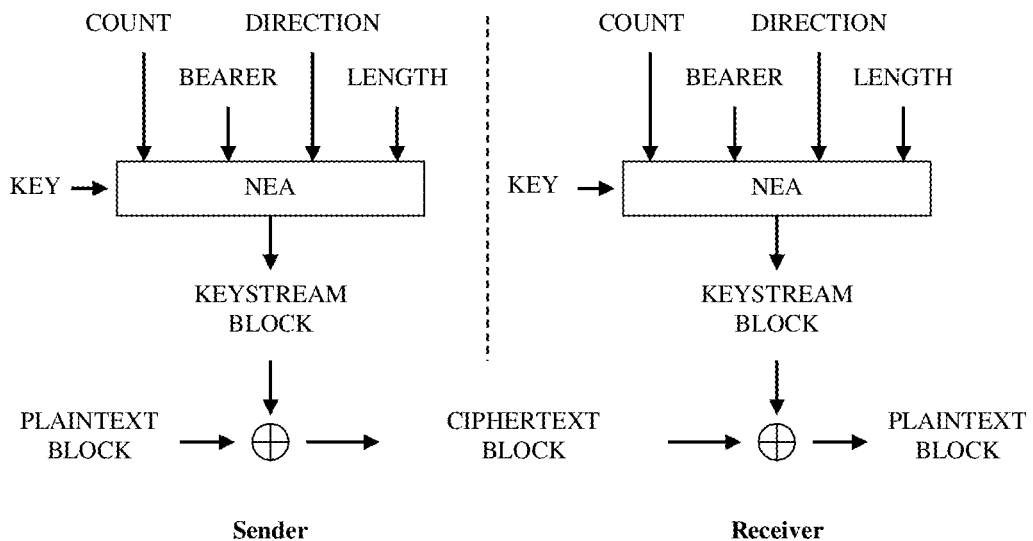
FIG. 3 illustrates the use of a ciphering algorithm NEA to encrypt plaintext by applying a keystream using a bit per bit binary addition of the plaintext and the keystream.

FIG. 3 illustrates the use of a ciphering algorithm NEA to encrypt plaintext by applying a keystream using a bit per bit binary addition of the plaintext and the keystream. As shown in FIG. 3, the input parameters to the ciphering algorithm are a 128-bit cipher key named KEY, a 32-bit COUNT, a 5-bit bearer identity BEARER, the 1-bit direction of the transmission (i.e., DIRECTION), and the length of the keystream required (i.e., LENGTH). The DIRECTION bit shall be 0 for uplink and 1 for downlink.

A receiver may recover the plaintext by generating the same keystream using the same input parameters and applying a bit per bit binary addition with the ciphertext.

Based on the input parameters, the algorithm generates the output keystream block KEYSTREAM which is used to encrypt the input plaintext block PLAINTEXT to produce the output ciphertext block CIPHERTEXT.

The input parameter LENGTH shall affect only the length of the KEYSTREAM BLOCK, not the actual bits in it.

A null ciphering algorithm (NEA0) shall be implemented such that it generates a KEYSTREAM of all zeroes (see sub-clause D.2.1 of TS 33.501). The length of the KEY-STREAM generated shall be equal to the LENGTH input parameter. The generated KEYSTREAM requires no other input parameters but the LENGTH. Apart from this, all processing performed in association with ciphering shall be exactly the same as with any of the ciphering algorithms specified in Annex D of TS 33.501.

It shall be noted that the NEA0 provides no security.

Figure 4:
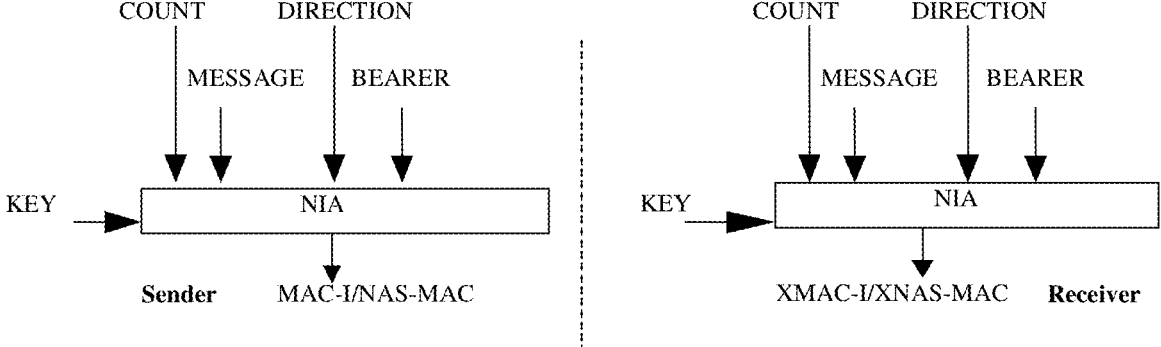
FIG. 4 illustrates the use of an integrity algorithm NIA to authenticate integrity of messages.

FIG. 4 illustrates the use of an integrity algorithm NIA to authenticate the integrity of messages. As shown in FIG. 4, the input parameters to the integrity algorithm are a 128-bit integrity key named KEY, a 32-bit COUNT, a 5-bit bearer identity called BEARER, the 1-bit direction of the transmission (i.e., DIRECTION), and the message itself (i.e., MESSAGE). The DIRECTION bit shall be 0 for uplink and 1 for downlink. The bit length of the MESSAGE is LENGTH.

Based on these input parameters, a sender computes a 32-bit message authentication code (Message Authentication Code-Integrity (MAC-I) or NAS-MAC) using the integrity algorithm NIA. The message authentication code is then appended to the message when sent. For integrity protection algorithms, a receiver computes the expected message authentication code (Expected Message Authentication Code-Integrity (XMAC)-I or XNAS-MAC) on the message received in the same way as the sender computed its message authentication code on the message sent and verifies the data integrity of the message by comparing it to the received message authentication code, i.e. MAC-I/NAS-MAC. It shall be understood that NAS-MAC and XNAS-MAC are NAS (Non-Access Stratum) layer generated Message Authentication Code and Expected Message Authentication Code, respectively. It is generated by Mobile Equipment (ME) as well as Access and Mobility Management Function (AMF) depending upon the data packet or control signal direction.

A null integrity algorithm (NIA0) shall be implemented in such way that it shall generate a 32-bit MAC-I/NAS-MAC and XMAC-I/XNAS-MAC of all zeroes (see sub-clause D.3.1 of TS 33.501). Replay protection shall not be activated when NIA0 is activated. All processing performed in association with integrity (except for replay protection) shall be exactly the same as with any of the integrity algorithms specified in this annex except that the receiver does not check the received MAC. It shall be noted that the reason for mentioning the replay protection is that replay protection is associated with integrity.

The NIA0 shall not be used for signaling radio bearers (SRBs) except for unauthenticated emergency sessions for unauthenticated UEs in limited service mode (LSM).

The NIA0 shall not be used for data radio bearers (DRBs).

A UE with a 2G SIM is considered to be in LSM in NR.

It shall be noted that the integrity algorithm NIA0 provides no security.

As described above, supporting of Emergency for UE-to-Network Relaying is studied and concluded in TR 23.700-33. The corresponding security key issue (KI) was discussed in TR 33.740 and the solution for the security KI was proposed in the same TR.

However, the current solution only covered how to proceed control plane (CP) traffic for emergency relay service. Concretely, null ciphering and null integrity are used to protect Direct Security Mode Command procedure. There is no solution for handling user plane (UP) traffic for emergency case. Hence, the protection of the UP traffic between the 5G ProSe remote UE and the 5G ProSe Layer-3 UE-to-Network Relay in emergency case needs to be studied.

In addition, according to Annex D of TS 33.501, the NIA0 shall not be used for DRBs. Thus, the straightforward solution, as known as CP traffic protection solution, which is using the null integrity algorithm, may not work for handling UP traffic in emergency case.

The present disclosure provides a solution for handling UP traffic for emergency case. According to the solution, a first terminal device determines that UP traffic is to be communicated between the first terminal device and a second terminal device without confidentiality protection and determines that the UP traffic is to be communicated between the first terminal device and the second terminal device without integrity protection or with a partial integrity protection. In this way, the UP traffic may be communicated without the confidentiality protection or the integrity protection, or without the confidentiality protection and with the partial integrity protection.

Hereinafter, principle of the present disclosure will be described with reference to FIGS. 5 to 12.

Figure 5:
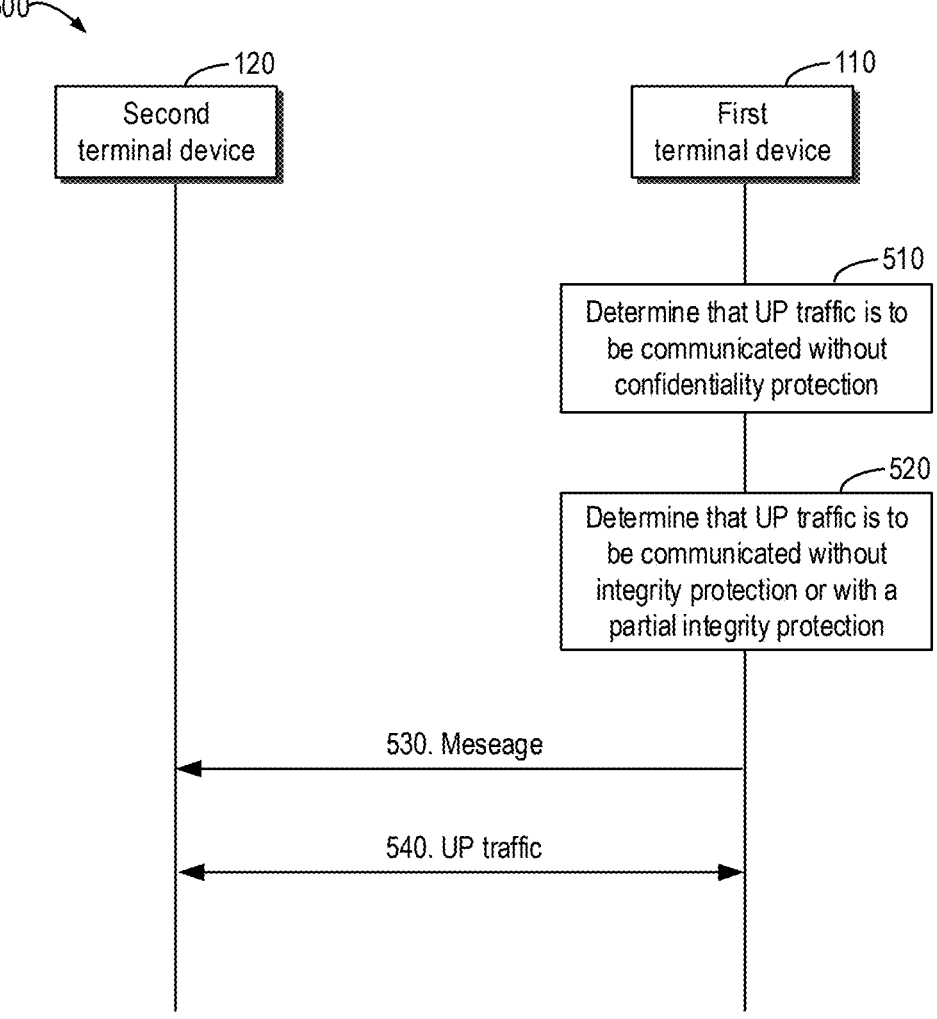
FIG. 5 illustrates a signaling chart illustrating a process for handling UP traffic for emergency case in accordance with some example embodiments of the present disclosure.

FIG. 5 illustrates a signaling chart illustrating a process 500 for handling UP traffic for emergency case in accordance with some example embodiments of the present disclosure. For the purpose of discussion, the process 500 will be described with reference to FIG. 1. The process 500 may involve the first terminal device 110 and the second terminal device 120 in FIG. 1.

As shown in FIG. 5, the first terminal device 110 determines 510 that UP traffic is to be communicated between the first terminal device 110 and the second terminal device 120 without confidentiality protection.

The first terminal device 110 determines 520 that the UP traffic is to be communicated between the first terminal device 110 and the second terminal device 120 without integrity protection or with a partial integrity protection.

In turn, the first terminal device 110 transmits 530 a message to the second terminal device 120. The message indicates that the UP traffic is to be communicated without the confidentiality protection or the integrity protection, or without the confidentiality protection and with the partial integrity protection.

Then, the first terminal device 110 communicates 540 the UP traffic between the first terminal device 110 and the second terminal device 120 without the confidentiality protection or the integrity protection, or without the confidentiality protection and with the partial integrity protection.

In some example embodiments, the first terminal device 110 may determine that the UP traffic is to be communicated without the confidentiality protection based on at least one of the following:

at least one local policy, an emergency RSC received from the second terminal device 120, at least one UP security policy received from the second terminal device 120, capability of the first terminal device 110, or capability of the second terminal device 120.

In some example embodiments, the first terminal device 110 may determine that the UP traffic is to be communicated without the integrity protection or with the partial integrity protection based on at least one of the following:

at least one local policy, an emergency RSC received from the second terminal device 120, at least one UP security policy received from the second terminal device 120, capability of the first terminal device 110, or capability of the second terminal device 120.

Hereinafter, some example implementations of the process 500 will be described with reference to FIGS. 6 to 8.

Figure 6:
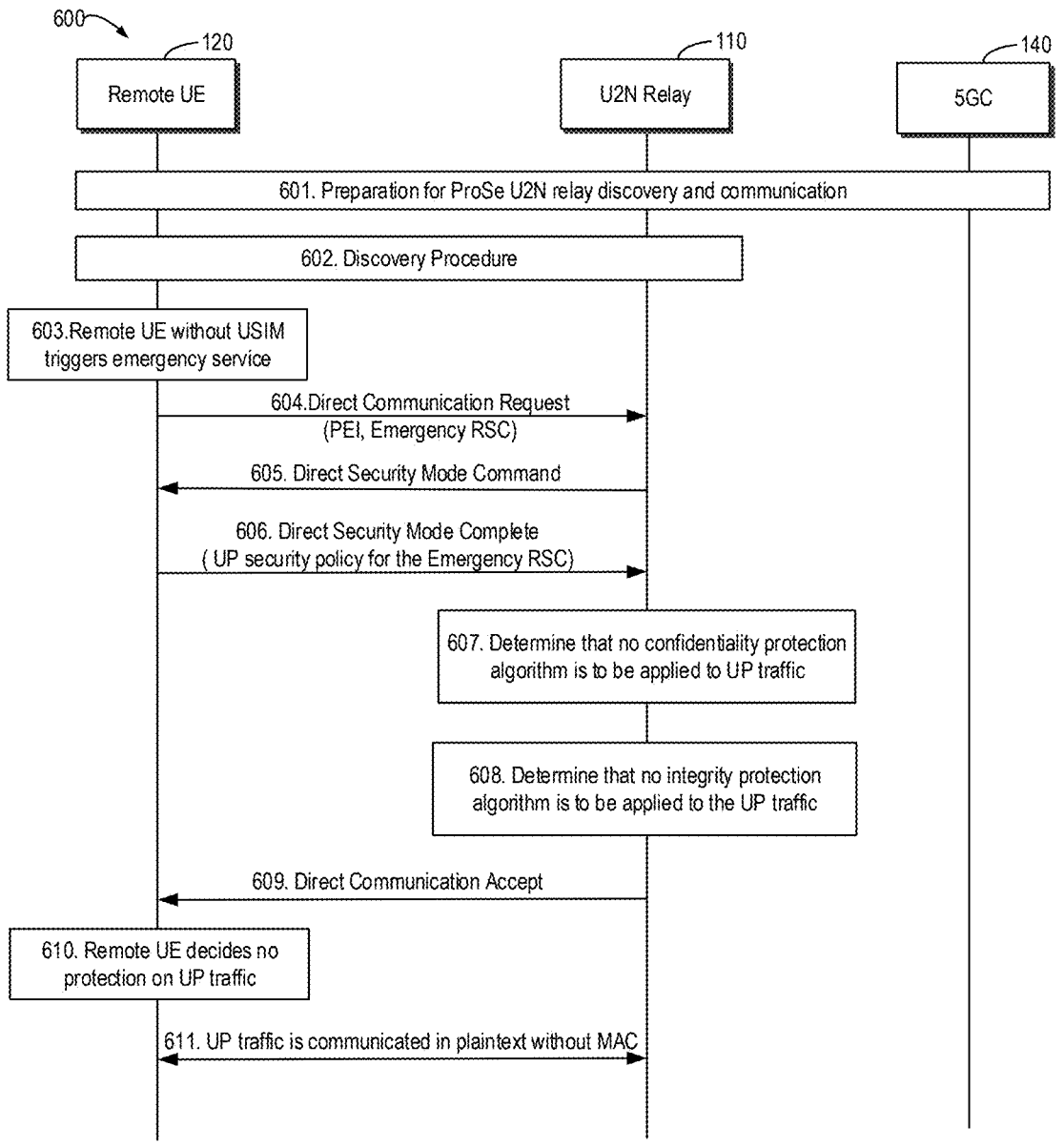
FIGS. 6 to 8 illustrate a signaling chart illustrating an example implementation of a process for handling UP traffic for emergency case in accordance with some example embodiments of the present disclosure, respectively.
Figure 7:
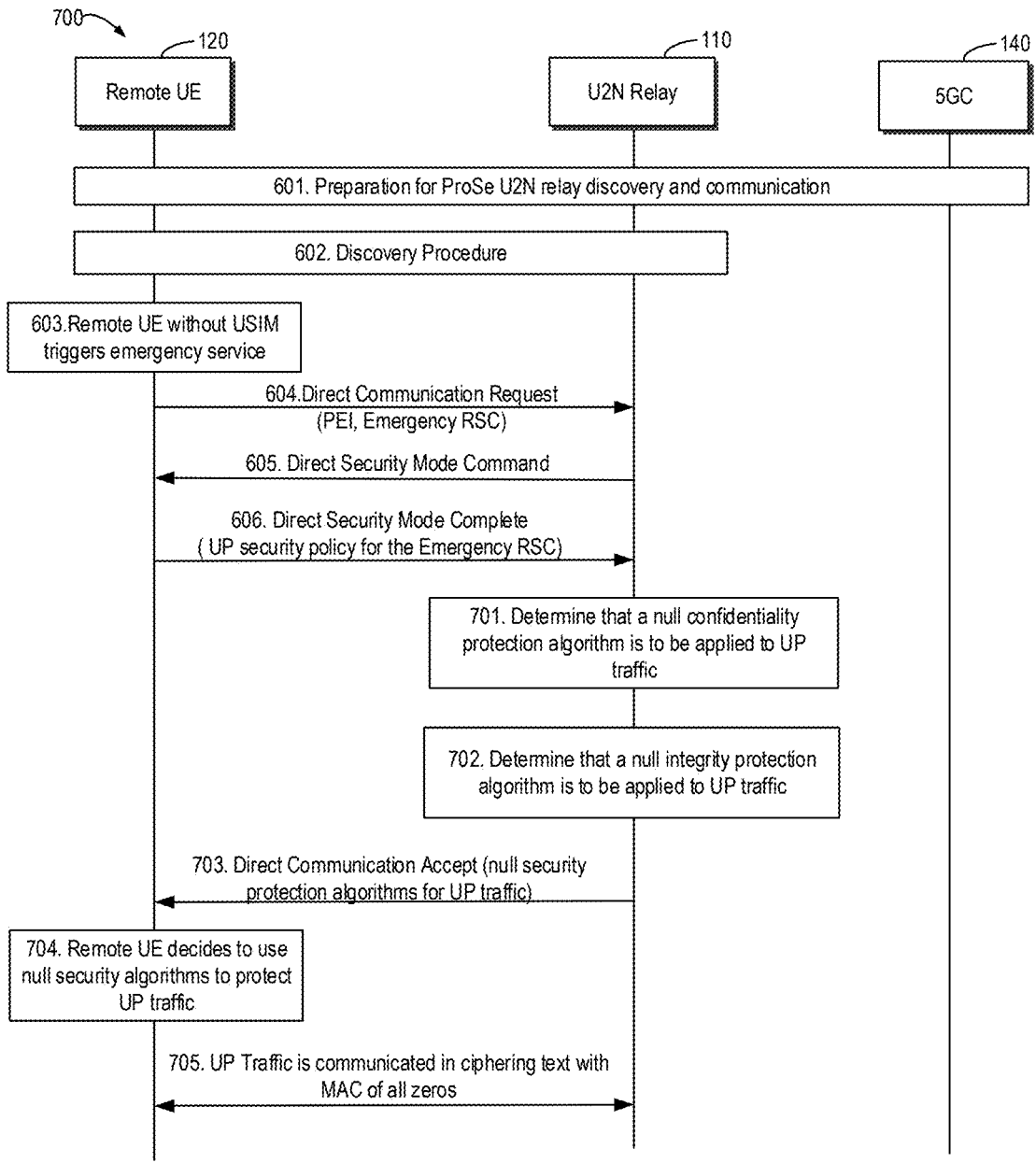
Figure 8:
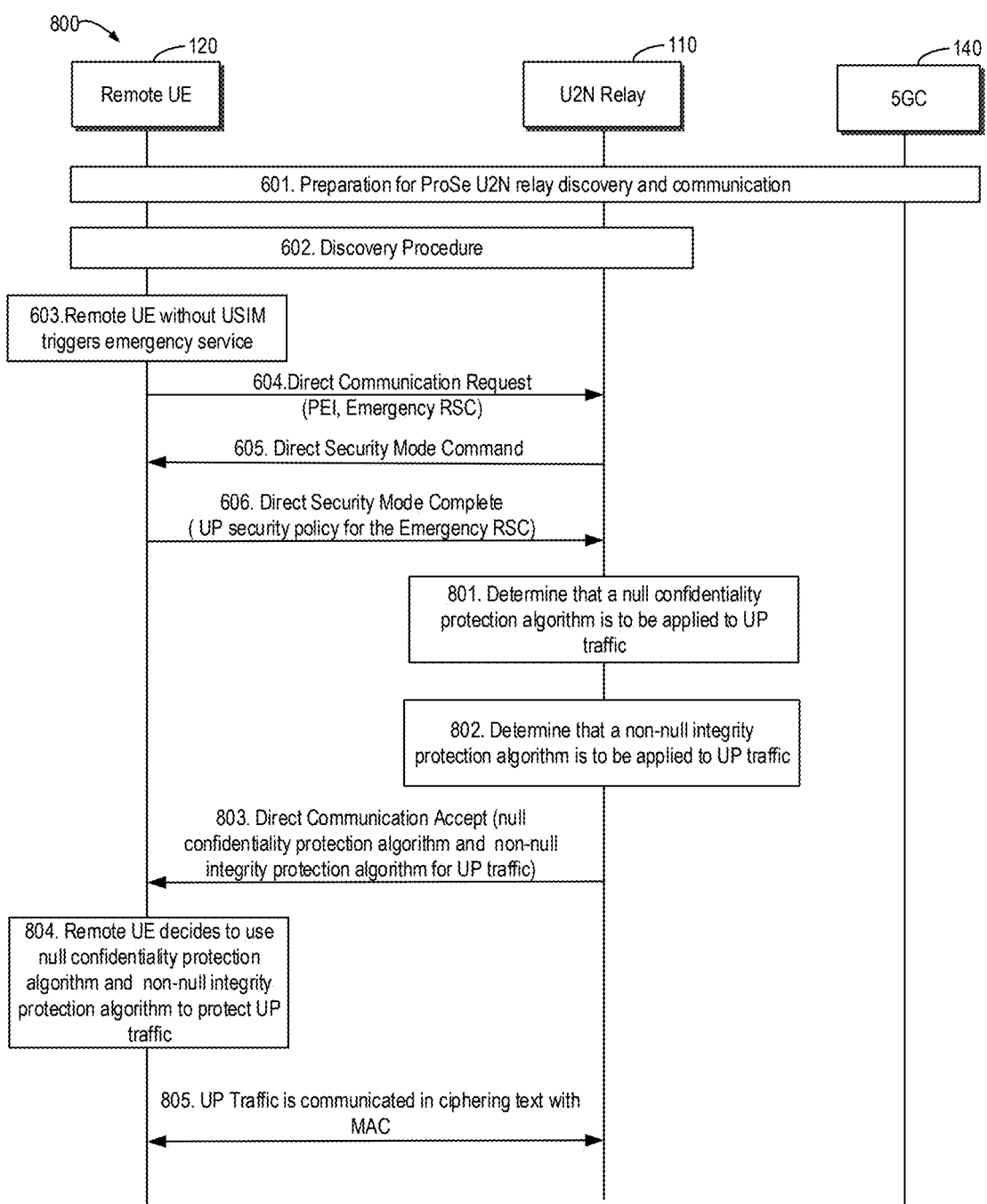

In the example implementations of FIGS. 6 to 8, a U2N relay and a remote UE are taken as an example of the first terminal device 110 and the second terminal device 120, respectively. The remote UE 120 has no USIM. The similar processes can be applicable to the remote UE 120 with USIM but failed on authentication and authorization for general ProSe U2N relay service.

FIG. 6 illustrates a signaling chart illustrating a process 600 for handling UP traffic for emergency case in accordance with some example embodiments of the present disclosure. The process 600 may be considered as an example implementation of the process 500. For the purpose of discussion, the process 600 will be described with reference to FIG. 1. The process 600 may involve the first terminal device 110, the second terminal device 120 and the 5GC 140 in FIG. 1.

At 601, preparation for 5G ProSe UE-to-Network relay communication is performed among the first terminal device 110, the second terminal device 120 and the 5GC 140. The first terminal device 110 and the second terminal device are authenticated and authorized, and probably provision with security information during preparation phase.

In some example embodiments, steps 0a to 1b of FIG. 6.3.3.2.2-1 for PC5 security establishment procedure for 5G ProSe UE-to-Network relay communication over User Plane or steps 0a to 0b of FIG. 6.3.3.3.2-1 for PC5 security establishment procedure for 5G ProSe UE-to-Network relay communication over Control Plane from TS 33.503 may be performed.

The remote UE 120 or the U2N relay 110 initiates 602 discovery procedure using any of Model A or Model B method as specified in clause 6.3.1.2 or 6.3.1.3 of TS 23.304 respectively.

After the discovery of the U2N relay 110, the remote UE 120 without USIM triggers 603 an emergency service.

The remote UE 120 transmits 604 a Direct Communication Request message comprising PEI and an emergency RSC to the U2N relay 110.

The U2N relay 110 transmits 605 a direct security mode command to the remote UE 120 to establish secure PC5 link, especially to protect PC5 signaling.

The remote UE 120 responds 606 to the U2N relay 110 with a Direct Security Mode Complete message. The Direct Security Mode Complete message comprises at least one UP security policy for the emergency RSC.

Based on at least one local policy, the received emergency RSC and at least one UP security policy for the emergency RSC from the remote UE 120, capabilities of the remote UE 120 and the U2N relay 110, the U2N relay 110 determines 607 that no confidentiality protection algorithm is to be applied to UP traffic. In this way, the cost to run ciphering or deciphering algorithm may be reduced.

For example, a UP security policy from the remote UE 120 may indicate that security protection for UP traffic is not needed. A local policy of the relay UE 110 may indicate that emergency service is supported even if the remote UE 120 has no USIM or the remote UE with USIM is failed on authentication and authorization for general ProSe U2N relay service. Based on the UP-security policy from the remote UE 120 and the local policy of the relay UE 110, the U2N relay 110 determines that no confidentiality protection algorithm is to be applied to UP traffic. It shall be understood that the U2N relay 110 may determine that no confidentiality protection algorithm is to be applied to UP traffic based on any other UP security policy or local policy of the relay UE 110.

Based on at least one local policy, the received emergency RSC and at least one UP security policy for the emergency RSC from the remote UE 120, capabilities of the remote UE 120 and the U2N relay 110, the U2N relay 110 determines 608 that no integrity protection algorithm is to be applied to the UP traffic. $K_{NRP}$-sess ID of this security context is ignored. In this way, the bandwidth to transmit the "fake" MAC may be reduced, which complies to rule defined in TS 33.501 that "The NIA0 shall not be used for data radio bearers (DRBs)".

For example, a UP security policy from the remote UE 120 may indicate that security protection for UP traffic is not needed. A local policy of the relay UE 110 may indicate that emergency service is supported even if the remote UE 120 has no USIM or the remote UE with USIM is failed on authentication and authorization for general ProSe U2N relay service. Based on the UP-security policy from the remote UE 120 and the local policy of the relay UE 110, the U2N relay 110 determines that no integrity protection algorithm is to be applied to UP traffic. It shall be understood that the U2N relay 110 may determine that no integrity protection algorithm is to be applied to UP traffic based on any other UP security policy or local policy of the relay UE 110.

The U2N relay 110 transmits 609 a Direct Communication Accept message to the remote UE 120. The Direct Communication Accept message may indicate that the UP traffic is to be communicated without the confidentiality protection or the integrity protection. For example, the Direct Communication Accept message indicates that no confidentiality protection algorithm and no integrity protection algorithm are to be applied to the UP traffic. For example, a Chosen_algos information element (IE) in the Direct Communication Accept message may be empty.

Upon receiving the Direct Communication Accept message, the remote UE 120 decides 610 not to protect the UP traffic for the emergency service as no security algorithm is chosen by the U2N relay 110.

The remote UE 120 and U2N relay 110 communicate 611, via PC5 link, the UP traffic in plain text without any MAC being appended.

FIG. 7 illustrates a signaling chart illustrating a process 700 for handling UP traffic for emergency case in accordance with some example embodiments of the present disclosure. The process 700 may be considered as an example implementation of the process 500. For the purpose of discussion, the process 700 will be described with reference to FIG. 1. The process 700 may involve the first terminal device 110, the second terminal device 120 and the 5GC 140 in FIG. 1.

Actions at 601 to 606 in the process 700 are similar to those in the process 600. Thus, details of these actions are omitted for brevity.

Actions at 701 to 705 in the process 700 are different from the actions in the process 600.

Specifically, based on the at least one local policy, the received emergency RSC and the at least one UP security policy for the emergency RSC from the remote UE 120, capabilities of the remote UE 120 and the U2N relay 110, the U2N relay 110 determines 701 a null confidentiality protection algorithm is to be applied to the UP traffic.

For example, a UP security policy from the remote UE 120 may indicate that security protection for UP traffic is not needed. A local policy of the relay UE 110 may indicate that emergency service is supported even if the remote UE 120 has no USIM or the remote UE with USIM is failed on authentication and authorization for general ProSe U2N relay service. Based on the UP-security policy from the remote UE 120 and the local policy of the relay UE 110, the U2N relay 110 determines that a null confidentiality protection algorithm is to be applied to UP traffic. It shall be understood that the U2N relay 110 may determine that the null confidentiality protection algorithm is to be applied to UP traffic based on any other UP security policy or local policy of the relay UE 110.

Based on the at least one local policy, the received emergency RSC and the at least one UP security policy for the emergency RSC from the remote UE 120, capabilities of the remote UE 120 and the U2N relay 110, the U2N relay 110 determines 702 a null integrity protection algorithm is to be applied to the UP traffic.

For example, a UP security policy from the remote UE 120 may indicate that security protection for UP traffic is not needed. A local policy of the relay UE 110 may indicate that emergency service is supported even if the remote UE 120 has no USIM or the remote UE with USIM is failed on authentication and authorization for general ProSe U2N relay service. Based on the UP-security policy from the remote UE 120 and the local policy of the relay UE 110, the U2N relay 110 determines that a null integrity protection algorithm is to be applied to UP traffic. It shall be understood that the U2N relay 110 may determine that the null integrity protection algorithm is to be applied to UP traffic based on any other UP security policy or local policy of the relay UE 110.

The U2N relay 110 transmits 703 a Direct Communication Accept message to the remote UE 120. The Direct Communication Accept message may indicate that the UP traffic is to be communicated without the confidentiality protection or the integrity protection. For example, the Direct Communication Accept message may indicate the chosen null security algorithms in Chosen_algos IE. The chosen null security algorithms comprise the null confidentiality protection algorithm and the null integrity protection algorithm.

Upon receiving the Direct Communication Accept message, the remote UE 120 decides 704 to use the null confidentiality algorithm and the null integrity algorithm for the UP traffic for the emergency service as null security algorithms chosen by the U2N relay 110.

The remote UE 120 and the U2N relay 110 generate cipher text (i.e., the UP traffic) with a KEYSTREAM of all zeroes, respectively.

The remote UE 120 and the U2N relay 110 communicate 705 the UP traffic in ciphering text with MAC of all zeroes via PC5 link. The MAC of all zeroes is also referred to as a first MAC.

FIG. 8 illustrates a signaling chart illustrating a process 800 for handling UP traffic for emergency case in accordance with some example embodiments of the present disclosure. The process 800 may be considered as an example implementation of the process 500. For the purpose of discussion, the process 800 will be described with reference to FIG. 1. The process 800 may involve the first terminal device 110, the second terminal device 120 and the 5GC 140 in FIG. 1.

Actions at 601 to 606 in the process 800 are similar to those in the process 600. Action at 801 in the process 800 is similar to the action at 701 in the process 700. Thus, details of these actions are omitted for brevity.

Actions at 802 to 805 in the process 800 are different from the actions in the processes 600 and 700.

Specifically, based on the at least one local policy, the received emergency RSC and the at least one UP security policy for the emergency RSC from the remote UE 120, capabilities of the remote UE 120 and the U2N relay 110, the U2N relay 110 determines 802 a non-null integrity protection algorithm is to be applied to the UP traffic.

For example, a UP security policy from the remote UE 120 may indicate that integrity protection for UP traffic is preferred or required. A local policy of the relay UE 110 may indicate that emergency service is supported even if the remote UE 120 has no USIM or the remote UE with USIM is failed on authentication and authorization for general ProSe U2N relay service. Based on the UP-security policy from the remote UE 120 and the local policy of the relay UE 110, the U2N relay 110 determines that the non-null integrity protection algorithm is to be applied to UP traffic. It shall be understood that the U2N relay 110 may determine that the non-null integrity protection algorithm is to be applied to UP traffic based on any other UP security policy or local policy of the relay UE 110.

In some example embodiments, examples of the non-null integrity protection algorithm may include but are not limited to: 128-NIA1, 128-NIA2 or 128-NIA3.

The U2N relay 110 transmits 803 a Direct Communication Accept message to the remote UE 120. The Direct Communication Accept message may indicate that the UP traffic is to be communicated without the confidentiality protection and with the partial integrity protection. For example, the Direct Communication Accept message may indicate the null confidentiality protection algorithm for the UP traffic and the non-null integrity protection algorithm for the UP traffic in Chosen_algos IE. By using the non-null integrity protection algorithm for the UP traffic, the integrity of the UP traffic can be protected in some extent. For example, this may prevent data loss against undeliberate unstable radio situation.

Upon receiving the Direct Communication Accept message, the remote UE 120 decides 804 to use the null confidentiality algorithm and the non-null integrity algorithm for the UP traffic for the emergency service.

In order to communicate the UP traffic, the remote UE 120 and the U2N relay 110 generate cipher text (i.e., the UP traffic) with a KEYSTREAM of all zeroes, respectively.

In addition, the remote UE 120 and the U2N relay 110 generate, by using the non-null integrity protection algorithm, an MAC based on at least one of the following respectively: a COUNT, an identity of a bearer for the UP traffic, an indication of a transmission direction of the UP traffic, an integrity key of all zeroes (i.e., the KEYSTREAM of all zeroes), or an UP message carrying the UP traffic. The generated MAC is also referred to as a second MAC.

In some example embodiments, the COUNT may indicate the number or sequence of the UP message. In addition, the COUNT may be used for replay protection. For example, the COUNT may be a 32-bit (Packet Data Convergence Protocol, PDCP) COUNT.

In some example embodiments, the identity of the bearer for the UP traffic may be a 5-bit bearer identity called BEARER.

In some example embodiments, the indication of a transmission direction of the UP traffic may be 1-bit direction of the transmission. The indication may be 0 for uplink and 1 for downlink.

In some example embodiments, the integrity key of all zeroes may be a 128-bit integrity key of all zeroes.

In turn, the remote UE 120 and the U2N relay 110 communicate 805 the UP traffic in ciphering text with the generated MAC via PC5 link.

In example embodiments where the UP traffic is to be communicated with the partial integrity protection, the remote UE 120 and the U2N relay 110 may generate a third MAC based on at least one of the following respectively: a COUNT, an identity of a bearer for the UP traffic, an indication of a transmission direction of the UP traffic, or an UP message carrying the UP traffic. In turn, the remote UE 120 and the U2N relay 110 may communicate the UP traffic with the third MAC. It shall be noted that in such example embodiments, the U2N relay 110 does not need to determine 3GPP defined algorithm because there is no key. In such example embodiments, the third MAC may be Message Digest algorithm 5 (MD5) or Secure Hash Algorithm 256 bit (SHA-256). MD5 uses hash function to generate 128-bit hash value. Output of SHA-256 is 256-bit long.

In some example embodiments, the first terminal device 110 may determine that the UP traffic is to be communicated without the confidentiality protection by determining a null confidentiality protection algorithm is to be applied to the UP traffic. In such example embodiments, the first terminal device 110 may determine that the UP traffic is to be communicated without the integrity protection by determining that no integrity protection algorithm is to be applied to the UP traffic. In such example embodiments, the first terminal device 110 may encrypt the UP traffic with a keystream of all zeroes by using the null confidentiality protection algorithm. In turn, the first terminal device 110 may communicate the UP traffic in ciphering text without an MAC.

In some example embodiments, the first terminal device 110 may determine that the UP traffic is to be communicated without the confidentiality protection by determining that no confidentiality protection algorithm is to be applied to the UP traffic. In such example embodiments, the first terminal device 110 may determine that the UP traffic is to be communicated without the integrity protection by determining a null integrity protection algorithm is to be applied to the UP traffic. In such example embodiments, the first terminal device 110 may generate a first MAC of all zeroes by using the null integrity protection algorithm and communicate the UP traffic in plain text with the first MAC of all zeroes.

In some example embodiments, the first terminal device 110 may determine that the UP traffic is to be communicated without the confidentiality protection by determining that no confidentiality protection algorithm is to be applied to the UP traffic. In such example embodiments, the first terminal device 110 may determine that the UP traffic is to be communicated with the partial integrity protection by determining a non-null integrity protection algorithm for the UP traffic based on capabilities of the first terminal device and the second terminal device. In such example embodiments, the first terminal device 110 may generate a second MAC by using the non-null integrity protection algorithm. The second MAC may be generated based on at least one of the following: a COUNT, an identity of a bearer for the UP traffic, an indication of a transmission direction of the UP traffic, an integrity key of all zeroes, or an UP message carrying the UP traffic. In turn, the first terminal device 110 may communicate the UP traffic in plain text with the second MAC.

FIG. 9 shows a flowchart of an example method 900 implemented at a first terminal device in accordance with some example embodiments of the present disclosure. For the purpose of discussion, the method 900 will be described from the perspective of the first terminal device 110 with respect to FIG. 1.

At block 910, the first terminal device 110 determines that UP traffic is to be communicated between the first terminal device 110 and a second terminal device 120 without confidentiality protection.

At block 920, the first terminal device 110 determines that the UP traffic is to be communicated between the first terminal device 110 and the second terminal device 120 without integrity protection or with a partial integrity protection.

At block 930, the first terminal device 110 transmits a message to the second terminal device 120. The message indicates that the UP traffic is to be communicated without the confidentiality protection or the integrity protection, or without the confidentiality protection and with the partial integrity protection.

At block 940, the first terminal device 110 communicates the UP traffic between the first terminal device 110 and the second terminal device 120 without the confidentiality protection or the integrity protection, or without the confidentiality protection and with the partial integrity protection.

In some example embodiments, determining that the UP traffic is to be communicated without the confidentiality protection may comprise determining that the UP traffic is to be communicated without the confidentiality protection based on at least one of the following:

at least one local policy, an emergency RSC received from the second terminal device 120, at least one UP security policy received from the second terminal device 120, capability of the first terminal device 110, or capability of the second terminal device 120.

In some example embodiments, determining that the UP traffic is to be communicated without the integrity protection or with the partial integrity protection may comprise determining that the UP traffic is to be communicated without the integrity protection or with the partial integrity protection based on at least one of the following:

at least one local policy, an emergency RSC received from the second terminal device 120, at least one UP security policy received from the second terminal device 120, capability of the first terminal device 110, or capability of the second terminal device 120.

In some example embodiments, determining that the UP traffic is to be communicated without the confidentiality protection may comprise: determining that no confidentiality protection algorithm is to be applied to the UP traffic. Communicating the UP traffic may comprise communicating the UP traffic in plain text.

In some example embodiments, determining that the UP traffic is to be communicated without the confidentiality protection may comprise: determining a null confidentiality protection algorithm is to be applied to the UP traffic. Communicating the UP traffic may comprise: encrypting the UP traffic with a keystream of all zeroes by using the null confidentiality protection algorithm.

In some example embodiments, determining that the UP traffic is to be communicated without the integrity protection may comprise: determining that no integrity protection algorithm is to be applied to the UP traffic. Communicating the UP traffic may comprise: communicating the UP traffic without a MAC.

In some example embodiments, determining that the UP traffic is to be communicated without the integrity protection may comprise: determining a null integrity protection algorithm is to be applied to the UP traffic. Communicating the UP traffic may comprise: generating a first MAC of all zeroes by using the null integrity protection algorithm and communicating the UP traffic with the first MAC.

In some example embodiments, determining that the UP traffic is to be communicated with the partial integrity protection may comprise: determining a non-null integrity protection algorithm for the UP traffic based on capabilities of the first terminal device 110 and the second terminal device 120. Communicating the UP traffic may comprise: generating, by using the non-null integrity protection algorithm, a second MAC based on at least one of the following: a COUNT, an identity of a bearer for the UP traffic, an indication of a transmission direction of the UP traffic, an integrity key of all zeroes, or an UP message carrying the UP traffic; and communicating the UP traffic with the second MAC.

In some example embodiments, communicating the UP traffic with the partial integrity protection may comprise: generating a third MAC based on at least one of the following: a COUNT, an identity of a bearer for the UP traffic, an indication of a transmission direction of the UP traffic, or an UP message carrying the UP traffic; and communicating the UP traffic with the third MAC.

FIG. 10 shows a flowchart of an example method 1000 implemented at a second terminal device in accordance with some example embodiments of the present disclosure. For the purpose of discussion, the method 1000 will be described from the perspective of the second terminal device 110 with respect to FIG. 1.

At block 1010, the second terminal device 120 receives a message from the first terminal device 110. The message indicates that UP traffic is to be communicated between the first terminal device 110 and the second terminal device 120 without confidentiality protection or integrity protection, or without the confidentiality protection and with a partial integrity protection.

At block 1020, the second terminal device 120 communicates, based on the message, the UP traffic between the first terminal device 110 and the second terminal device 120 without the confidentiality protection or the integrity protection, or without the confidentiality protection and with the partial integrity protection.

In some example embodiments, the message indicates that the UP traffic is to be communicated without the confidentiality protection by indicating that no confidentiality protection algorithm is to be applied to the UP traffic. Communicating the UP traffic may comprise: communicating the UP traffic in plain text.

In some example embodiments, the message indicates that the UP traffic is to be communicated without the confidentiality protection by indicating a null confidentiality protection algorithm for the UP traffic. Communicating the UP traffic may comprise: encrypting the UP traffic with a keystream of all zeroes.

In some example embodiments, the message indicates that the UP traffic is to be communicated without the integrity protection by indicating that no integrity protection algorithm is to be applied to the UP traffic. Communicating the UP traffic may comprise: communicating the UP traffic without a MAC.

In some example embodiments, the message indicates that the UP traffic is to be communicated without the integrity protection by indicating a null integrity protection algorithm for the UP traffic. Communicating the UP traffic may comprise: generating a first MAC of all zeroes and communicating the UP traffic with the first MAC.

In some example embodiments, the message indicates that the UP traffic is to be communicated with the partial integrity protection by indicating a non-null integrity protection algorithm for the UP traffic. Communicating the UP traffic may comprise: generating, by using the non-null integrity protection algorithm, a second MAC based on at least one of the following a COUNT, an identity of a bearer for the UP traffic, an indication of a transmission direction of the UP traffic, an integrity key of all zeroes or an UP message carrying the UP traffic; and communicating the UP traffic with the second MAC.

In some example embodiments, communicating the UP traffic with the partial integrity protection comprises: generating a third MAC based on at least one of the following a COUNT, an identity of a bearer for the UP traffic, an indication of a transmission direction of the UP traffic, or an UP message carrying the UP traffic; and communicating the UP traffic with the third MAC.

In some example embodiments, the method 1000 further comprises: transmitting at least one UP security policy to the first terminal device 110.

In some example embodiments, an apparatus capable of performing any of the method 900 (for example, the first terminal device 110) may comprise means for performing the respective operations of the method 900. The means may be implemented in any suitable form. For example, the means may be implemented in a circuitry or software module. The apparatus may be implemented as or included in the first terminal device 110. In some example embodiments, the means may comprise a processor and a memory.

In some example embodiments, the apparatus comprises: means for determining, at a first terminal device, that user plane (UP) traffic is to be communicated between the first terminal device and a second terminal device without confidentiality protection; means for determining that the UP traffic is to be communicated between the first terminal device and the second terminal device without integrity protection or with a partial integrity protection; means for transmitting, to the second terminal device, a message indicating that the UP traffic is to be communicated without the confidentiality protection or the integrity protection, or without the confidentiality protection and with the partial integrity protection; and means for communicating the UP traffic between the first terminal device and the second terminal device without the confidentiality protection or the integrity protection, or without the confidentiality protection and with the partial integrity protection.

In some example embodiments, the means for determining that the UP traffic is to be communicated without the confidentiality protection may comprise means for determining that the UP traffic is to be communicated without the confidentiality protection based on at least one of the following:

at least one local policy, an emergency RSC received from the second terminal device, at least one UP security policy received from the second terminal device, capability of the first terminal device, or capability of the second terminal device.

In some example embodiments, the means for determining that the UP traffic is to be communicated without the integrity protection or with the partial integrity protection may comprise determining that the UP traffic is to be communicated without the integrity protection or with the partial integrity protection based on at least one of the following:

at least one local policy, an emergency RSC received from the second terminal device, at least one UP security policy received from the second terminal device, capability of the first terminal device, or capability of the second terminal device.

In some example embodiments, the means for determining that the UP traffic is to be communicated without the confidentiality protection may comprise: means for determining that no confidentiality protection algorithm is to be applied to the UP traffic. The means for communicating the UP traffic may comprise means for communicating the UP traffic in plain text.

In some example embodiments, the means for determining that the UP traffic is to be communicated without the confidentiality protection may comprise: means for determining a null confidentiality protection algorithm is to be applied to the UP traffic. The means for communicating the UP traffic may comprise: means for encrypting the UP traffic with a keystream of all zeroes by using the null confidentiality protection algorithm.

In some example embodiments, the means for determining that the UP traffic is to be communicated without the integrity protection may comprise: means for determining that no integrity protection algorithm is to be applied to the UP traffic. The means for communicating the UP traffic may comprise: means for communicating the UP traffic without a MAC.

In some example embodiments, the means for determining that the UP traffic is to be communicated without the integrity protection may comprise: means for determining a null integrity protection algorithm is to be applied to the UP traffic. The means for communicating the UP traffic may comprise: means for generating a first MAC of all zeroes by using the null integrity protection algorithm and means for communicating the UP traffic with the first MAC.

In some example embodiments, the means for determining that the UP traffic is to be communicated with the partial integrity protection may comprise: means for determining a non-null integrity protection algorithm for the UP traffic based on capabilities of the first terminal device and the second terminal device. The means for communicating the UP traffic may comprise: means for generating, by using the non-null integrity protection algorithm, a second MAC based on at least one of the following: a COUNT, an identity of a bearer for the UP traffic, an indication of a transmission direction of the UP traffic, an integrity key of all zeroes, or an UP message carrying the UP traffic; and means for communicating the UP traffic with the second MAC.

In some example embodiments, the means for communicating the UP traffic with the partial integrity protection may comprise: means for generating a third MAC based on at least one of the following: a COUNT, an identity of a bearer for the UP traffic, an indication of a transmission direction of the UP traffic, or an UP message carrying the UP traffic; and means for communicating the UP traffic with the third MAC.

In some example embodiments, an apparatus capable of performing any of the method 1000 (for example, the second terminal device 120) may comprise means for performing the respective operations of the method 1000. The means may be implemented in any suitable form. For example, the means may be implemented in a circuitry or software module. The apparatus may be implemented as or included in the second terminal device 120. In some example embodiments, the means may comprise a processor and a memory.

In some example embodiments, the apparatus comprises: means for receiving, at a second terminal device from a first terminal device, a message indicating that user plane (UP) traffic is to be communicated between the first terminal device and the second terminal device without confidentiality protection or integrity protection, or without the confidentiality protection and with a partial integrity protection; and means for communicating, based on the message, the UP traffic between the first terminal device and the second terminal device without the confidentiality protection or the integrity protection, or without the confidentiality protection and with the partial integrity protection.

In some example embodiments, the message indicates that the UP traffic is to be communicated without the confidentiality protection by indicating that no confidentiality protection algorithm is to be applied to the UP traffic. The means for communicating the UP traffic may comprise: means for communicating the UP traffic in plain text.

In some example embodiments, the message indicates that the UP traffic is to be communicated without the confidentiality protection by indicating a null confidentiality protection algorithm for the UP traffic. The means for communicating the UP traffic may comprise: means for encrypting the UP traffic with a keystream of all zeroes.

In some example embodiments, the message indicates that the UP traffic is to be communicated without the integrity protection by indicating that no integrity protection algorithm is to be applied to the UP traffic. The means for communicating the UP traffic may comprise: means for communicating the UP traffic without a MAC.

In some example embodiments, the message indicates that the UP traffic is to be communicated without the integrity protection by indicating a null integrity protection algorithm for the UP traffic. The means for communicating the UP traffic may comprise: means for generating a first MAC of all zeroes and means for communicating the UP traffic with the first MAC.

In some example embodiments, the message indicates that the UP traffic is to be communicated with the partial integrity protection by indicating a non-null integrity protection algorithm for the UP traffic. The means for communicating the UP traffic may comprise: means for generating, by using the non-null integrity protection algorithm, a second MAC based on at least one of the following a COUNT, an identity of a bearer for the UP traffic, an indication of a transmission direction of the UP traffic, an integrity key of all zeroes or an UP message carrying the UP traffic; and means for communicating the UP traffic with the second MAC.

In some example embodiments, the means for communicating the UP traffic with the partial integrity protection comprises: means for generating a third MAC based on at least one of the following a COUNT, an identity of a bearer for the UP traffic, an indication of a transmission direction of the UP traffic, or an UP message carrying the UP traffic; and means for communicating the UP traffic with the third MAC.

In some example embodiments, the apparatus further comprises: means for transmitting at least one UP security policy to the first terminal device.

It shall be understood that details of example embodiments of the present disclosure which have been described with reference to FIGS. 5 to 8 are also applied to the methods 900 and 1000.

Figure 11:
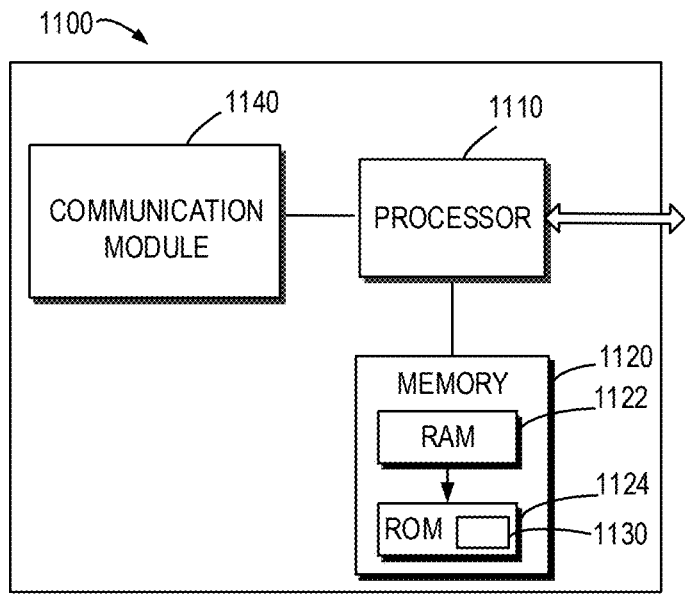
FIG. 11 illustrates a simplified block diagram of an apparatus that is suitable for implementing example embodiments of the present disclosure.

FIG. 11 is a simplified block diagram of a device 1100 that is suitable for implementing embodiments of the present disclosure. The device 1100 may be provided to implement a communication device, for example, the first terminal device 110 or the second terminal device 120 as shown in FIG. 1. As shown, the device 1100 includes one or more processors 1110, one or more memories 1120 coupled to the processor 1110, and one or more communication modules 1140 coupled to the processor 1110.

The communication module 1140 is for bidirectional communications. The communication module 1140 has at least one antenna to facilitate communication. The communication interface may represent any interface that is necessary for communication with other network elements.

The processor 1110 may be of any type suitable to the local technical network and may include one or more of the following: general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

The memory 1120 may include one or more non-volatile memories and one or more volatile memories. Examples of the non-volatile memories include, but are not limited to, a Read Only Memory (ROM) 1124, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1122 and other volatile memories that will not last in the power-down duration.

A computer program 1130 includes computer executable instructions that are executed by the associated processor 1110. The program 1130 may be stored in the ROM 1124. The processor 1110 may perform any suitable actions and processing by loading the program 1130 into the RAM 1122.

The embodiments of the present disclosure may be implemented by means of the program 1130 so that the device 1100 may perform any process of the disclosure as discussed with reference to FIGS. 1 to 10. The embodiments of the present disclosure may also be implemented by hardware or by a combination of software and hardware.

Figure 12:
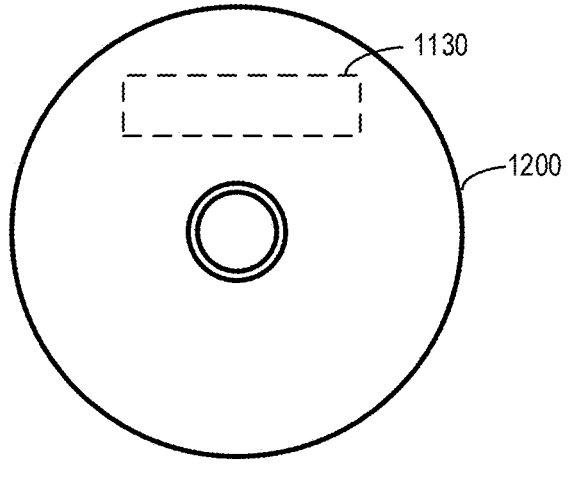
FIG. 12 illustrates a block diagram of an example computer readable medium in accordance with some example embodiments of the present disclosure.

In some example embodiments, the program 1130 may be tangibly contained in a computer readable medium which may be included in the device 1100 (such as in the memory 1120) or other storage devices that are accessible by the device 1100. The device 1100 may load the program 1130 from the computer readable medium to the RAM 1122 for execution. The computer readable medium may include any types of tangible non-volatile storage, such as ROM, EPROM, a flash memory, a hard disk, CD, DVD, and the like. FIG. 12 shows an example of the computer readable medium 1200 in form of CD or DVD. The computer readable medium has the program 1130 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 900 and 1000 as described above with reference to FIGS. 9 and 10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first terminal device, comprising: at least one processor; and at least one memory storing instructions that, when executed by the at least one processor, cause the first terminal device at least to: determine that user plane (UP) traffic is to be communicated between the first terminal device and a second terminal device without confidentiality protection based on at least one of the following: at least one local policy, an emergency relay service code (RSC) received from the second terminal device, at least one UP security policy received from the second terminal device, or a capability of the first terminal device; determine that the UP traffic is to be communicated between the first terminal device and the second terminal device without integrity protection or with a partial integrity protection;

transmit, to the second terminal device, a message indicating that the UP traffic is to be communicated without the confidentiality protection or the integrity protection, or without the confidentiality protection and with the partial integrity protection; communicate the UP traffic between the first terminal device and the second terminal device without the confidentiality protection or the integrity protection, or without the confidentiality protection and with the partial integrity protection, wherein the determining that the UP traffic is to be communicated without the confidentiality protection or the integrity protection, or without the confidentiality protection and with the partial integrity protection is performed after transmitting a direct security mode command to the second terminal device and before transmitting a direct communication accept message to the second terminal device.

2. The first terminal device of claim 1, wherein the first terminal device is further caused to determine that the UP traffic is to be communicated without the confidentiality protection based on a capability of the second terminal device.

3. The first terminal device of claim 1, wherein the first terminal device is caused to determine that the UP traffic is to be communicated without the integrity protection or with the partial integrity protection based on at least one of the following: at least one local policy, an emergency relay service code (RSC) received from the second terminal device, at least one UP security policy received from the second terminal device, capability of the first terminal device, or a capability of the second terminal device.

4. The first terminal device of claim 1, wherein: the first terminal device is caused to determine that the UP traffic is to be communicated without the confidentiality protection by: determining that no confidentiality protection algorithm is to be applied to the UP traffic; and the first terminal device is caused to communicate the UP traffic by: communicating the UP traffic in plain text.

5. The first terminal device of claim 1, wherein: the first terminal device is caused to determine that the UP traffic is to be communicated without the confidentiality protection by: determining a null confidentiality protection algorithm is to be applied to the UP traffic; and the first terminal device is caused to communicate the UP traffic by: encrypting the UP traffic with a keystream of all zeroes by using the null confidentiality protection algorithm.

6. The first terminal device of claim 1, wherein: the first terminal device is caused to determine that the UP traffic is to be communicated without the integrity protection by: determining that no integrity protection algorithm is to be applied to the UP traffic; and the first terminal device is caused to communicate the UP traffic by: communicating the UP traffic without a message authentication code (MAC).

7. The first terminal device of claim 1, wherein: the first terminal device is caused to determine that the UP traffic is to be communicated without the integrity protection by: determining a null integrity protection algorithm is to be applied to the UP traffic; and the first terminal device is caused to communicate the UP traffic by: generating a first message authentication code (MAC) of all zeroes by using the null integrity protection algorithm; and communicating the UP traffic with the first MAC.

8. The first terminal device of claim 1, wherein: the first terminal device is caused to determine that the UP traffic is to be communicated with the partial integrity protection by: determining a non-null integrity protection algorithm for the UP traffic based on capabilities of the first terminal device and the second terminal device; and the first terminal device is caused to communicate the UP traffic by: generating, by using the non-null integrity protection algorithm, a second message authentication code (MAC) based on at least one of the following: a COUNT, an identity of a bearer for the UP traffic, an indication of a transmission direction of the UP traffic, an integrity key of all zeroes, or an UP message carrying the UP traffic; and communicating the UP traffic with the second MAC.

9. The first terminal device of claim 1, wherein: the first terminal device is caused to communicate the UP traffic with the partial integrity protection by: generating a third message authentication code (MAC) based on at least one of the following: a COUNT, an identity of a bearer for the UP traffic, an indication of a transmission direction of the UP traffic, or an UP message carrying the UP traffic; and communicating the UP traffic with the third MAC.

10. A second terminal device, comprising: at least one processor; and at least one memory storing instructions that, when executed by the at least one processor, cause the second terminal device at least to: receive, from a first terminal device, a message indicating that user plane (UP) traffic is to be communicated between the first terminal device and the second terminal device without confidentiality protection or integrity protection, or without the confidentiality protection and with a partial integrity protection; communicate, based on the message, the UP traffic between the first terminal device and the second terminal device without the confidentiality protection or the integrity protection, or without the confidentiality protection and with the partial integrity protection; and transmit at least one UP security policy to the first terminal device, wherein determining that the UP traffic is to be communicated without the confidentiality protection or the integrity protection, or without the confidentiality protection and with the partial integrity protection is performed after the first terminal device transmitting a direct security mode command to the second terminal device and before the first terminal device transmitting a direct communication accept message to the second terminal device.

11. The second terminal device of claim 10, wherein: the message indicates that the UP traffic is to be communicated without the confidentiality protection by: indicating that no confidentiality protection algorithm is to be applied to the UP traffic; and the second terminal device is caused to communicate the UP traffic by: communicating the UP traffic in plain text.

12. The second terminal device of claim 10, wherein: the message indicates that the UP traffic is to be communicated without the confidentiality protection by: indicating a null confidentiality protection algorithm for the UP traffic; and the second terminal device is caused to communicate the UP traffic by: encrypting the UP traffic with a keystream of all zeroes.

13. The second terminal device of claim 10, wherein: the message indicates that the UP traffic is to be communicated without the integrity protection by: indicating that no integrity protection algorithm is to be applied to the UP traffic; and the second terminal device is caused to communicate the UP traffic by: communicating the UP traffic without a message authentication code (MAC).

14. The second terminal device of claim 10, wherein: the message indicates that the UP traffic is to be communicated without the integrity protection by: indicating a null integrity protection algorithm for the UP traffic; and the second terminal device is caused to communicate the UP traffic by: generating a first message authentication code (MAC) of all zeroes; and communicating the UP traffic with the first MAC.

15. The second terminal device of claim 10, wherein: the message indicates that the UP traffic is to be communicated with the partial integrity protection by: indicating a non-null integrity protection algorithm for the UP traffic; and the second terminal device is caused to communicate the UP traffic by: generating, by using the non-null integrity protection algorithm, a second message authentication code (MAC) based on at least one of the following: a COUNT, an identity of a bearer for the UP traffic, an indication of a transmission direction of the UP traffic, an integrity key of all zeroes or an UP message carrying the UP traffic; and communicating the UP traffic with the second MAC.

16. The second terminal device of claim 10, wherein: the second terminal device is caused to communicate the UP traffic with the partial integrity protection by: generating a third message authentication code (MAC) based on at least one of the following: a COUNT, an identity of a bearer for the UP traffic, an indication of a transmission direction of the UP traffic, or an UP message carrying the UP traffic; and communicating the UP traffic with the third MAC.

\* \* \* \* \*